Dec. 4, 1951 W. H. HARSTICK ET AL 2,577,326
LIQUID SUPPLY MEANS FOR POWER
WASHING CREAM SEPARATOR

Filed July 14, 1948 2 SHEETS—SHEET 1

Inventors:
William H. Harstick
Hilmond O. Vogel
Paul O. Pippel
Atty.

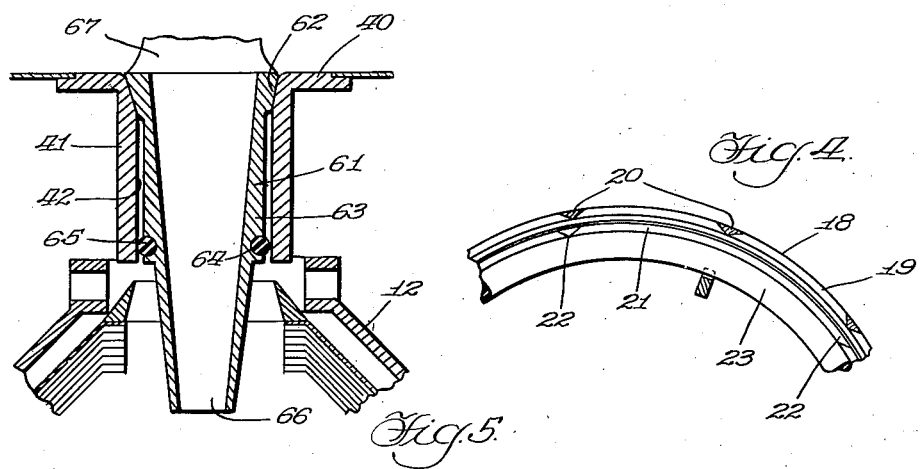
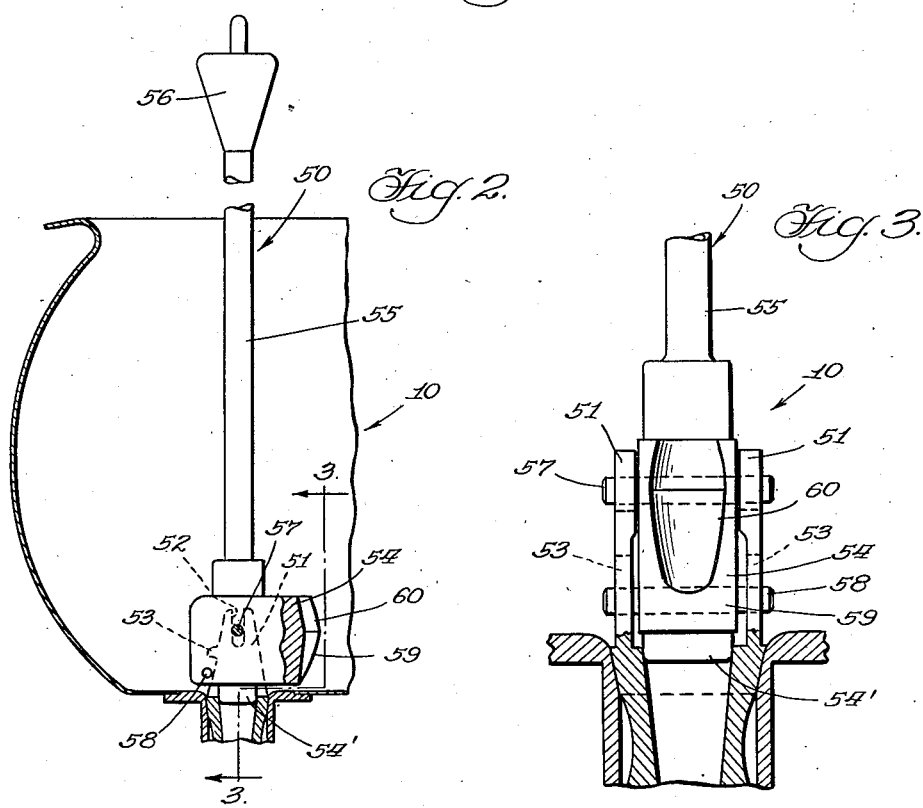

Patented Dec. 4, 1951

2,577,326

UNITED STATES PATENT OFFICE 2,577,326

LIQUID SUPPLY MEANS FOR POWER WASHING CREAM SEPARATOR

William H. Harstick, Oak Park, and Hilmond O. Vogel, Chicago, Ill., assignors to International Harvester Company, a corporation of New Jersey Application July 14, 1948, Serial No. 38,614

6 Claims. (Cl. 233—1)

This invention relates to a power washing cream separator. More specifically, the invention relates to an improved combined milk and washing liquid supply means for a power self-washing cream separator.

In the application of W. H. Harstick, Serial No. 678,863, filed July 24, 1946 now Patent Number 2,504,681, a power or self-washing cream separator is described and disclosed. A power washing cream separator of the type disclosed in this application consists essentially of a revoluble separating bowl having therein a plurality of superimposed frustro-conical separating disks. The separating bowl is provided at its maximum internal periphery with a centrifugally operable discharge valve, operable to control the discharge of a washing liquid therethrough. A supply can is positioned above the cream separator bowl and a discharge tube is in communication therewith. The discharge tube is in axial alignment with the revoluble separating bowl. The discharge tube also includes a milk feed tube having at its upper end a shoulder portion for regulating the discharge of washing liquid through the discharge tube.

During the washing operation of a cream separator bowl of this type the milk feed tube is axially displaceable with respect to the discharge tube for permitting predetermined quantities of washing liquid to escape through the discharge tube into the separating bowl for cleaning and washing the interior of the bowl. Upon the entrance of a washing liquid into the separating bowl the bowl is sufficiently slowed down during the speed of rotation so that the centrifugally operable peripheral discharge valve opens to permit the escape and discharge of the washing liquid from the separating bowl.

The milk feed tube is provided with a handle which the operator can grasp in order to axially displace the milk feed tube from the discharge tube. In this manner the operator controls the amount of washing liquid which is distributed into the separating bowl. During the cleaning operation the operator may axially displace the milk feed tube from the discharge tube two or three times, in each case permitting a sufficient quantity of washing liquid to enter into the separating bowl so that the interior of the same is properly cleansed.

The milk feed tube is designed to project downwardly into a cylindrical space formed by the inner peripheral edges of the disk pack. The lower-most portion of the milk feed tube is in communication with a distributor chamber formed in the lower portion of the bowl. The distributor chamber is utilized during the cream separating operation and the feed tube supplies whole milk thereto. In order to secure proper separation it is desirable that the milk feed tube is securely positioned within the discharge tube so that the lower-most discharge end of the milk feed tube is continually in axial alignment with the separating bowl and cannot readily be cocked or otherwise displaced during the separating operation. At the same time, it is also desirable to provide a milk feed tube which readily may be axially displaced from the discharge tube during the sequence of washing operations by the operator as above mentioned. The prime object of this invention, therefore, is to provide an improved liquid supply and feeding arrangement for a power washing cream separating bowl.

A still further object is to provide a milk feed tube for a power washing cream separator, said milk feed tube being designed to remain in complete axial alignment with the separating bowl during the separating operation.

A still further object is to provide a supply means for a power washing cream separating bowl, said supply means including a supply can having a discharge tube and a milk feed tube positioned therein, said milk feed tube being readily displaceable from the discharge tube for regulating the control of washing liquid to the separating bowl during the power washing sequence of operation.

A still further object is to provide a discharge tube for supplying washing liquid to a power washing cream separating bowl, said tube including a shoulder at its upper end engageable with a portion of the discharge tube for sealing the same, said tube also including a body portion having a rounded annular enlargement at its lower end, said enlargement cooperating with the discharge tube for sealing the same until the enlargement and the milk feed tube is axially removed from the discharge tube, thereby permitting the discharge of washing liquid to the separating bowl.

Another object is to provide a supply means for a power washing separator bowl, said supply means including a supply can having a discharge tube in axial alignment with a revoluble separating bowl, said discharge tube including a milk feed tube positioned therein, said milk feed tube including a resilient ring and being constructed and arranged to permit quick axial displacement from the discharge tube during a washing operation.

These and other objects will become more readily apparent during a reading of the specification when examined in connection with the drawings.

In the drawings:

Fig. 2 is a cross sectional view in elevation through a liquid supply means showing a valve arrangement therefor.

Fig. 3 is a sectional view taken substantially along the line 3—3 of Fig. 2.

Fig. 4 is a sectional view taken substantially along the line 4—4 of Fig. 1.

Fig. 5 is a cross sectional view through a portion of a liquid supply means of a modified form of the invention.

Figure 1:
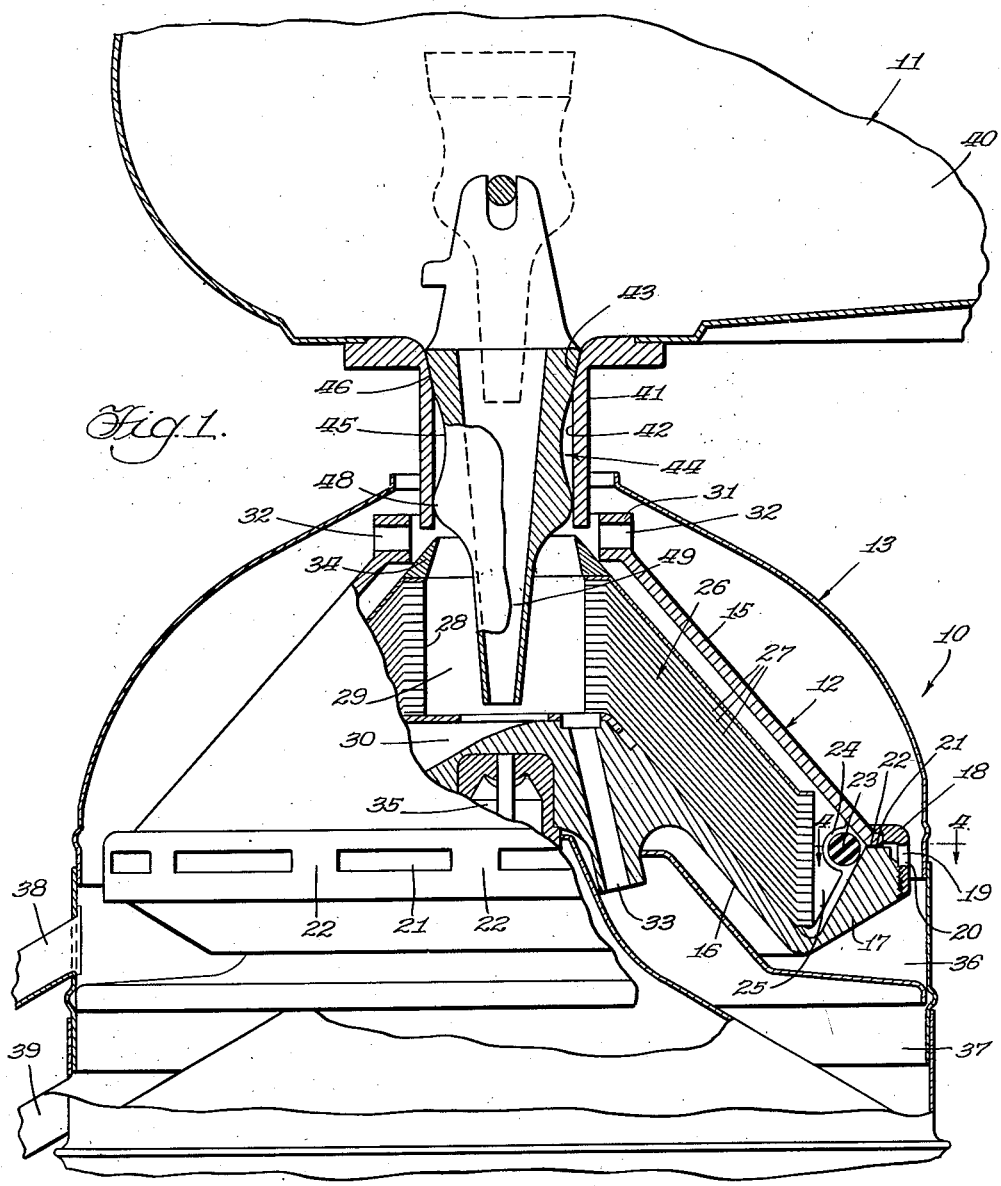
Fig. 1 is a side elevational view, partially in section, of a centrifugal separator embodying an improved liquid supply means.

Referring particularly to Fig. 1, a centrifugal cream separator is generally designated by the reference character 10. The cream separator 10 is of the power washing type and essentially consists of an improved supply means generally designated by the reference character 11. The cream separator 10 also includes a revoluble separating bowl 12 surrounded by the usual type of tinware structure 13.

The revoluble separating bowl 12 consists of an upper bowl part, or section 15, and a lower bowl part 16. The bowl parts 15 and 16 are conventionally of annular construction and the lower bowl part 16 consists of an upwardly extending annular ring 17. The parts 15 and 16 are connected together by means of a threaded collar 18 which securely holds the bowl parts in assembly. The threaded collar 18 includes a substantially continuous peripheral discharge opening 19 best shown in Figs. 1 and 4. The discharge opening 19 is substantially continuous with the exception of a plurality of circumferentially extending connecting spacers 20.

The upper and lower bowl parts 15 and 16 are secured together by means of the threaded collar 18 and inlude a substantially continuous peripheral discharge opening 21. A plurality of circumferentially spaced spacers 22 suitably space the upper and lower bowl parts apart. A rubber sealing ring 23 is positioned adjacent the peripheral disharge opening 21. The rubber sealing ring 23 serves as a centrifugal valve member for regulating the discharge of washing liquid through the continuous peripheral discharge openings 19 and 21. The rubber sealing ring 23 is suitably retained in place by means of recesses 24 provided in downwardly extending wings 25. Only one of the wings 25 is shown, but a number of these may be circumferentially disposed adjacent to the continuous peripheral discharge opening 21.

The revoluble separating bowl 12 includes a disk pack 26. The disk pack 26 includes a plurality of superimposed frusto conical disks 27. The disks 27 are provided at their central portion with inner peripheral edges 28. The peripheral edges 28 define an axially extending unobstructed cylindrical space 29.

A distributor chamber 30 is provided at the lowermost portion of the bowl 12. The upper end of the bowl 12 is provided with a collar 31 which includes a plurality of skim milk openings 32. A cream outlet 33 is in communication with the cylindrical space 29 and extends downwardly with respect thereto. A divider disk 34 is positioned at the upper end of disk pack 26. The revoluble bowl 12 is suitably rotated by means of a driving member referred to by the reference character 35.

A tinware structure 13 may be of conventional design and includes a skim milk receiving chamber 36 and a cream receiving chamber 37. A skim milk spout 38 is in communication with the receiving chamber 36 and a cream discharge spout 39 is in communication with the cream receiving chamber 37.

The supply means 11 consists essentially of a supply can 40 positioned above the separating bowl 12. The supply can 40 includes a downwardly extending discharge tube 41. The discharge tube 41 is provided with an inner cylindrical surface 42 and has at its upper end a tapering portion 43.

A milk feed tube generally designated by the reference character 44 is positioned within the discharge tube 41. The feed tube 44 includes a body 45 substantially coextensive with the discharge tube 41. The body 45 has at its upper end a tapering shoulder portion 46 which normally engages the inner tapering portion 43 of the discharge tube 41 in sealing relation to restrain the discharge of liquid from passing into the discharge tube 41. By virtue of this construction the milk feed tube 44 is also axially retained within the discharge tube 41. The lower end of the body 45 is provided with a rounded annular enlargement 48. The annular enlargement 48 engages the inner surface 42 of the discharge tube 41 in a snug and sealing relation. The fit of the enlargement 48 with respect to the surface 42 is such that a sealing relation is effected although the feed tube 44 may readily slide with respect to the discharge tube 41.

The body 45 is provided with an integral tubular extension 49 which is of considerably less diameter in cross section than the body 45. The extension 49 projects downwardly into the cylindrical space 29 and is in close proximity to the upper end of the distributor chamber 30 of the separating bowl 12.

The feed tube 44 is connected to a combined float and handle arrangement generally designated by the reference character 50. The float and handle arrangement 50 includes a pair of upstanding leg members 51 which are integrally connected to the feed tube 44. The upstanding leg members 51 are also provided with slots 52 formed at the upper ends of the leg members. As best shown in Figs. 2 and 3 the leg members 51 also are provided with a pair of laterally spaced projections 53, the purpose of which will presently appear.

A valve member 54 is positioned for rotation about a transverse axis between the leg members 51. The valve member 54 is somewhat of a rectangular design and includes a tube 55 which in turn is connected to a float and handle member 56. The valve member 54 is arranged to pivot between the legs 51 by means of a pin 57 extending transversely through the slots 52. The valve member 54 is also provided with a transversely extending pin 58 which is adapted to engage the projections 53 during vertical movement of the valve member 54. As best shown in Figs. 2 and 3 the valve member 54 is also provided with a spherical face 59. The spherical face 59 includes a depression 60. The depression 60 forms a valley within the valve member and this valley, as best shown in Fig. 2, gradually increases in depth, the greatest depth being at the upper end of the valve member 54.

In the modification shown in Fig. 5 a feed tube 61 is positioned within the discharge tube 41 of the supply can 40. The feed tube 61 is somewhat similar in design to the feed tube 44 and includes at its upper end a shoulder portion 62 which is adapted to engage the inner tapering portion 43 of the discharge tube 41. The feed tube 61 also includes a body 63. The outer surface of the body 63 is of considerably less cross sectional diameter than the inner diameter of the tube 41. The body 63 is coextensive with the discharge tube 41 and has at its lower edge an annular recess 64. A resilient ring 65 is positioned within the recess 64, the outer surface of the resilient ring 65 projecting from the body 63 and engaging the inner surface 42 of the discharge tube 41 in sealing and relative sliding relation. A tubular extension 66 is integrally formed with the feed tube 61 with the extension projecting downwardly into the separating bowl 12. The feed tube is also provided with upstanding leg member 67, only one of which is shown.

The separating operation is conventional and whole milk flows down through the milk feed tube 44 into the distributor chamber 30 where it is subsequently fed to the disk pack 26 for separation. Skim milk is discharged through openings 32 and the cream is discharged through the cream outlet 33. During the separating operation the separating bowl 12 is rotated at a speed around ten thousand R. P. M. The flow of whole milk to the separating bowl is controlled by means of a combined float and handle member 50 as clearly disclosed and described in the afore mentioned application. As the milk level decreases the supply can 40 the float 56 is effective to rotate the valve member 54 which has previously been rotated to a somewhat angular position so that the plug 54' has been displaced from the milk feed tube 44. The spherical face 59 thereupon rotates over the upper end of the feed tube 44 and the depression 60 is effective to meter and regulate the control of milk to the separating bowl. For the purpose of the present application it will suffice to describe the function of the float and handle member 50 in the washing operation. After the cream separation has been completed it is then desired to wash the interior of the separating bowl. For this purpose the supply can is filled with a quantity of washing liquid or water. The float and handle member 50 is in the position shown in Fig. 2 and the plug 54' closes the feed tube 44. The tapering shoulder 46 of the feed tube is in sealing relation with respect to the inner tapering portion 43 of the discharge tube 41. It can be seen, therefore, that no washing liquid can in this position flow to the separating bowl.

The power for rotating the separating bowl is now shut off and the separating bowl is free to rotate without power. The operator thereupon lifts upwardly on the handle 50 whereupon the pins 57 and 58 move upwardly with respect to the leg members 51. The plug 54' thereupon becomes disengaged from the opening of the milk feed tube and the pin 58 engages the projections 53, thereupon also moving the milk feed tube also upwardly. The operator continues to move the milk feed tube 44 upwardly until the rounded annular enlargement 48 has cleared the upper edge of the discharge tube 41, whereupon a large quantity of washing liqid is discharged through the discharge tube 41 and into the cylindrical space 29 of the disk pack. As the washing liquid arrives within the cylindrical space 20 the inertia required to bring the washing liquid into rotating movement causes the speed of rotation of the separating bowl to be considerably lessened. As the speed of rotation of the separating bowl thereupon is lessened the sealing ring 23 contracts and opens the continuous discharge opening 21, through which the washing liquid is thereupon radially distributed. The interior of the separating bowl is thus flushed.

After the discharge of this initial amount of water the operator thereupon pushes downwardly on the handle 50 in turn replacing the tube 44 within the discharge tube 41. The plug 54" is also thus engaged with the feed tube 44 and the discharge of washing liquid through the discharge and feed tubes is thus stopped. The power for rotating the separating bowl is again set in motion until a high speed of rotation has been reached, whereupon the ring 23 is again expanded to seal the continuous discharge opening 21. After a desired speed has been reached the cycle is repeated and the operator again lifts upwardly on the handle member 50 to displace the discharge tube 44, thus in turn permitting washing liquid to enter into and through the discharge tube and the tube 44. This cycle of operation may be repeated three or four times until the operator is satisfied that the interior of the cream separating bowl has been sufficiently flushed clean.

The design of the feed tube is especially important in facilitating the separating and washing operation. During the separating operation the feed tube must be securely axially positioned so that the lower portion of the feed tube is at all times in complete axial alignment with the discharge chamber 30. Any cocking of the tube 44 would result in an unequal separating operation and the possible mixing of whole milk with the separated cream. It is therefore desirable to support the feed tube in a manner that will assure rigid and axial alignment at all times during the separating operation. This is readily accomplished by applicant's design wherein the feed tube is provided with the upper annular shoulder and the lower rounded annular enlargement which supports the feed tube within the discharge tube 41 in a rigid and positive manner.

During the washing operation as above mentioned it is readily apparent that the feed tube must be axially displaced a successive number of times during the washing cycle. In order to facilitate the ready axial displacement of the tube applicant has provided his milk feed tube with an annular rounded enlargement which may slide relative to the inner surface of the discharge tube in a ready manner and yet seal against the entrance of liquid into the discharge tube until the enlargement is completely displaced from the discharge tube. By providing a feed tube with a body portion of less diameter than the inner surface of the discharge tube the operator may readily remove the feed tube without the feed tube becoming wedged within the discharge tube 41. The enlargement 48 therefore serves to facilitate the removal of the discharge tube 44 and also functions to prevent liquid from passing through the discharge tube until the feed tube has been removed. During the washing operation it is extremely important that a large quantity of washing liquid be instantaneously directed to the separating bowl. By providing a feed tube shaped in the manner shown, applicant is able to control the discharge of liquid through the discharge tube 41 until the desired moment when the enlargement 48 has cleared the discharge tube 41.

The washing liquid flowing through the extension 49 is generally directed immediately to the distributor 30. The washing liquid which is supplied through the discharge tube 41 on the other hand supplies most of the washing liquid for washing the interior peripheral edges of the separating disks. Since the inner peripheral edges of the disks are the most difficult to wash clean it is important that a large amount of washing liquid be directed to the cylindrical space 20 at the proper moment during the washing cycle. The enlargement 48 serves to seal the discharge tube 41 until the feed tube 44 has been displaced, whereupon a large quantity of washing liquid immediately enters and impinges upon the peripheral edges of the disk pack. The sudden entrance of the large quantity of washing liquid serves to properly flush clean the peripheral edges of the disks.

The enlargement serves to prevent undesired small quantities of water from entering into the cylindrical space until the feed tube is almost completely removed whereupon a desired and immediate large column of water can enter into the cylindrical space.

In the modification shown in Fig. 5 the discharge tube 61 is also provided with a body 63 of substantially less cross sectional diameter. The entrance and discharge of washing liquid through the discharge tube here is controlled by means of a resilient ring 65 which may be of rubber or synthetics. The ring 65 functions in the same manner as the enlargement 48. Another important feature of the enlargement or rubber ring is that the feed tubes 44 and 63 can readily be displaced from the discharge tube 41 and any cocking of the feed tubes will not effect a wedging action against the inner surface 42 of the discharge tube 41. This is very important to accomplish the frequent and necessary axial displacement of the feed tube during the washing cycle.

It can readily now be seen that the objects of the invention have been fully achieved and a novel and improved supply means has been provided for regulating the flow of washing liquid to a power washing cream separator. It must be understood that modifications and changes may be made in the design which do not depart from the spirit of the invention as disclosed nor the scope thereof as defined in the appended claims.

What is claimed is:

1. A supply means adapted for supplying washing liquid and liquid to be treated to a separating bowl comprising a supply can, a discharge tube connected to said supply can and in communication therewith; a liquid feed tube within said discharge tube, said feed tube including a body having a shoulder engaging said discharge tube; a rounded annular enlargement adjacent the lower portion of said body, a tubular extension connected to said body and adapted to project into a separating bowl, and a handle on said feed tube whereby an operator may axially displace said feed tube from said discharge tube, said rounded enlargement engaging the inner wall of said discharge tube to seal the same against the discharge of water therethrough until said enlargement has been axially displaced from within said discharge tube.

2. A supply means adapted to supply washing liquid and liquid to be treated to a separating bowl comprising a supply can, a discharge tube connected to said supply can and in communication therewith; a liquid feed tube within said discharge tube, said feed tube including a body having a shoulder engaging said discharge tube; a rounded annular enlargement adjacent the lower portion of said body, and a handle on said feed tube whereby an operator may axially displace said feed tube from said discharge tube, said rounded enlargement engaging the inner wall of said discharge tube to seal the same against the discharge of water therethrough until said enlargement has been axially displaced from within said discharge tube.

3. A supply means adapted to supply liquid to be treated to a separating bowl comprising a supply can adapted to be positioned above a bowl; a discharge tube projecting downwardly from the supply can for axial alignment with a separating bowl; a feed tube positioned within said discharge tube; said feed tube including a cylindrical body of substantially less outer cross-sectional diameter than the inner diameter of said discharge tube; a shoulder engaging the upper portion of said discharge tube to seal the same, an annular enlargement having a rounded peripheral edge in snug sliding engagement with the inner wall of said discharge tube, said enlargement being positioned adjacent the lower edge of said discharge tube, a tubular extension of less cross sectional diameter than the body adapted to project into a revoluble separating bowl; and a handle connected to said feed tube whereby an operator may axially displace the feed tube from said discharge tube.

4. A means adapted to supply washing liquid and liquid to be treated to a centrifugal bowl, comprising a supply can; a discharge tube projecting downwardly from said supply can and adapted to be positioned over the inlet opening of a bowl, said discharge tube having an annular tapering surface adjacent the upper edge thereof; a liquid feed tube positioned within said discharge tube, said feed tube having a body portion including a tapering shoulder arranged to engage the annular tapering surface of said discharge tube in sealing relation, an annular resilient member encircling the body portion near the lower end thereof and projecting outwardly therefrom, said resilient member engaging the inner surface of said discharge tube in snug sliding relation, and a tubular extension on said discharge tube adapted to project downwardly into a separating bowl.

5. A supply means adapted to supply washing liquid and liquid to be treated to a separating bowl comprising a supply can, a discharge tube in communication with said supply can, a liquid feed tube within said discharge tube, said feed tube including a body having an annular shoulder at its upper end for engaging said discharge tube and sealing said discharge tube from communication with said supply can, an annular enlargement on said body, said enlargement being axially spaced with respect to said shoulder, and means for axially displacing said feed tube, said enlargement engaging said discharge tube to seal the same against the discharge of liquid therethrough until said enlargement has been axially displaced from within said tube.

6. A supply means in accordance with claim 5 wherein said annular enlargement includes an annular resilient member connected to said body and adapted to engage the discharge tube in snug sliding arrangement.

WILLIAM H. HARSTICK.
HILMOND O. VOGEL.

REFERENCES CITED

The following references are of record in the file of this patent:

UNITED STATES PATENTS

| Number | Name | Date |
|---|---|---|
| 576,945 | Brenneman | Feb. 9, 1897 |
| 1,308,469 | Amet | July 1, 1919 |
| 1,584,599 | Behrends | May 11, 1926 |
| 1,644,388 | Lindgren | Oct. 4, 1927 |
| 2,173,580 | Fawcett | Sept. 19, 1939 |
| 2,331,541 | Flowers | Mar. 9, 1943 |
| 2,450,308 | Smith | Sept. 28, 1948 |
| 2,504,261 | Harstick | Apr. 18, 1950 |